Aug. 25, 1964
A. N. BANKS
3,146,108
METHOD AND APPARATUS FOR THE AUTOMATIC
BREWING OF TEA AND LIKE BEVERAGES
Filed June 16, 1961
2 Sheets-Sheet 1
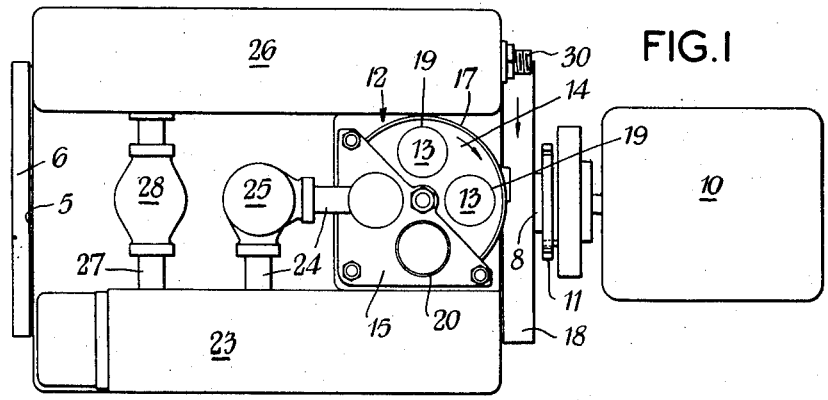

3,146,108
METHOD AND APPARATUS FOR THE AUTOMATIC BREWING OF TEA AND LIKE BEVERAGES
Arthur Neville Banks, London, England, assignor to Navy Army and Air Force Institutes, London, England
Filed June 16, 1961, Ser. No. 117,628
6 Claims. (Cl. 99—76)

This invention relates to the automatic brewing of tea and like beverages and has for its object to provide automatic apparatus in which the beverage, hereinafter referred to as tea, will be consistently infused or macerated for a predetermined period before being discharged into a receptacle.

According to the invention, automatic apparatus for the brewing of tea or the like comprises a rotor which is divided into a plurality of equal compartments and is rotatable intermittently inside a stationary cylinder, means for supplying the compartments in succession with predetermined charges of tea leaves and hot water in one position, in which the compartment is maintained for a predetermined infusion period, and a receptacle arranged to receive the infused tea in another position. At a further position, provision is made for discharging the spent tea leaves from the compartment.

Suitably, the rotor has four compartments and is rotatable in the cylinder about a horizontal axis through 90° at a time, so that each compartment progresses in successive operations from an upwardly facing charging and infusion position, through a lateral tea-discharging position, a downwardly facing tea leaf-discharging position and a lateral idle position back to the upwardly facing position.

One manner of carrying the invention into effect will now be more fully described by way of example and with reference to the accompanying, partly diagrammatic, drawings, in which:

FIGURE 1 is a plan view of an automatic tea-brewing unit,

FIGURE 2 is a perspective view to a larger scale from the front of the unit with certain parts omitted or indicated in chain-line outline only.

Figure 3:
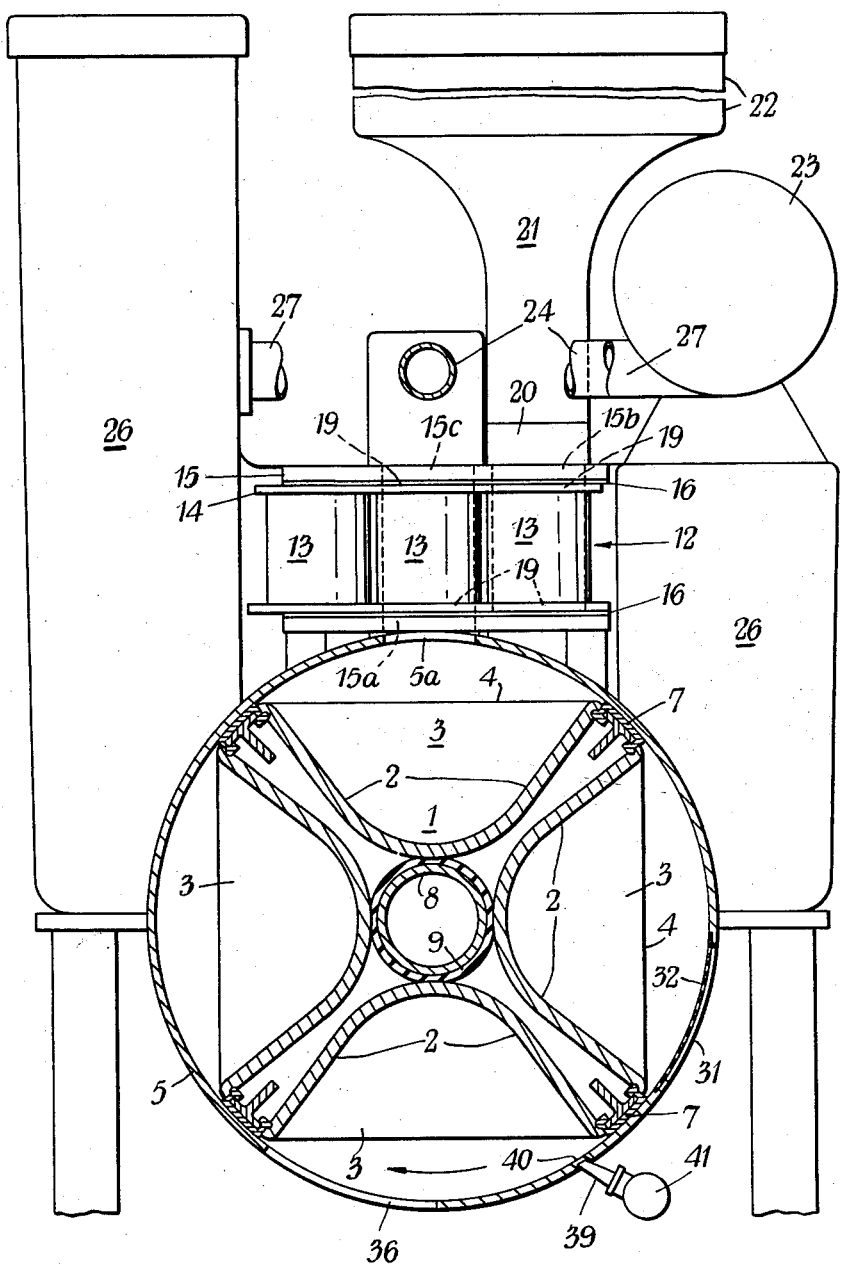
FIGURE 3 is a front elevation of the unit to yet a larger scale, the rotor and cylinder being shown in vertical cross section.

The unit illustrated comprises a rotor 1 divided by walls 2 (FIGURE 3) into four paraboliform compartments 3 of equal capacity bounded at the ends by walls 4, as shown, or by circular end plates. The rotor is mounted co-axially within a stationary outer cylinder 5 closed by covers 6 one or both of which may be removable to permit withdrawal of the rotor for maintenance purposes. The compartments are sealed off from each other by profiled packing strips 7 held between the pairs of walls. In the example illustrated, the rotor 1 is mounted on a hollow shaft 8 by means of a soft rubber sleeve 9, the shaft being rotated through 90° at a time from an A.C. electric motor 10 through an intermittent drive mechanism comprising, for example, a Geneva-wheel device indicated at 11 (FIGURE 1).

Dry tea leaves and boiling water are supplied to the uppermost compartment 3 under the control of a rotatable dispensing device 12 mounted above the cylinder 5. This device comprises four open-ended cylindrical tea-measuring chambers 13 which are carried between two plates 14 rotatably mounted between fixed plates 15 from which they are separated by seals 16. The plates 14 are connected together by an outer cylinder 17 (not shown in FIGURE 3). The dispensing device is also rotated intermittently through 90° at a time, for example from the intermittent drive mechanism through a wheel 18 which engages the cylinder 17 by slot-and-pin engagement. The plates 14 have four circular holes 19 communicating with the chambers 13. The lower plate 15 has a single hole 15a communicating with a hole 5a in the top of the cylinder 5. The upper plate 15 has two holes 15b, 15c at 90°. The hole 15b has an upstanding flange 20 and communicates with the funnel-shaped lower end 21 of a hopper 22 containing a stock of dry tea leaves. The other hole 15c in the plate 15 is in communication with a boiler or water heater 23 by way of a pipe 24 and under the control of an electromagnetic valve 25. This boiler may be a thermostatically controlled electrical boiler of the flash or instantaneous type and is set to deliver water at 212° F. It takes its supply of water from a storage tank 26 through a pipe 27 and under the control of an electromagnetic valve 28. The tank is maintained full by the action of a float-operated valve (not seen) in the said tank, which valve controls inflow from the main at an inlet 30. As may be seen from FIGURE 2, the storage tank 26 advantageously straddles or encloses at least the upper part of the cylinder 5. Advantageously, the storage tank 26 is provided with an immersion heater which serves to preheat the water in it to a temperature of 120° to 160° F. By this means also, the upper part at least of the cylinder 5 is maintained hot. The whole tank may be enclosed by lagging (not shown). If desired, the boiler 23 may itself be surrounded by the water tank.

The operation of the motor 10 and of the valves 25, 28, once a cycle of operations has been initiated by a switch operation by the attendant, is controlled wholly automatically by a timing device, which may be of known electrical type and may be adjustable. The control switch, timing device and other control means and instruments are mounted on a control panel which may be disposed at the front of the upper part of the apparatus.

Opposite the lower portion of the compartment 3 which faces to the right (FIGURE 3) in the position of rest of the rotor 1 is an opening 31 which extends for the length of the compartment and is covered by a strainer or filter 32 of wire-mesh or perforated metal. This opening 31 communicates by way of a funnel 33 (FIGURE 2) with a receptacle 34 for receiving the brewed tea. The tea may be drawn off from this receptacle as required, for example and as shown by means of a tap 35. Opposite to the left-hand side of the compartment 3 which is facing downwardly (FIGURE 3) is an opening or a series of openings 36 which communicate by way of a funnel 37 (FIGURE 2) with a receptacle 38 for spent tea leaves. To facilitate complete discharge of the said tea leaves from the compartment, a series of spray nozzles 39 (FIGURE 3) are directed, through holes 40 in the drum 5, so as to impinge obliquely on the far wall 2 and thus flush out the compartment. The supply of flushing water by way of a pipe 41 is controlled by an electromagnetic valve (not shown) actuated by the timing device. The receptacles 34 and 38 are slidably mounted on the base 42 of the apparatus and have removable covers 43 to allow cleaning and emptying. All of the parts of the apparatus which might affect the flavour of the tea, for example the compartments 3 and the cylinder 5, may be made of stainless steel or a non-porous refractory material. The packing strips 7 and seals 16 are also made of a material which is inert and will not affect the tea flavour, for example of the plastic, polytetrafluoroethylene. A vent (not shown) may be provided at the top of the cylinder 5 for the escape of steam. To ensure quick immersion of the dry tea leaves, the bases of the compartments 3 may be made with a slight fall towards one end or the middle of the apparatus.

The manner of operation of the apparatus is as follows: In the initial condition of the apparatus, the compartments 3 are all empty, a chamber 13 under the hopper 22 contains a charge of dry tea leaves, the valves 25 and 28 are closed and the motor 10 is at rest. When a supply of tea is required, the attendant closes a switch which sets the timing device in operation. The motor 10 is switched on and the dispensing device is turned through 90°. The measured charge of tea leaves falls from the chamber 13 through the lower hole 19 and the holes 15a, 5a into the upwardly facing compartment 3. Simultaneously or immediately thereafter, under the control of the timing device, the valve 25 is opened and a charge of boiling water, proportionate to the charge of tea leaves, is delivered from the boiler 23 through the pipe 24, chamber 13 and the aforesaid holes into the same compartment 3. The valve 25 is then closed and the valve 28 opened to supply a fresh charge of water to the boiler 23. After a period predetermined to allow for proper infusion or maceration, the rotor 1 is turned through 90° so that the said charged compartment 3 is brought opposite to the strainer 32. The tea leaves are retained, but the tea is discharged into the receptacle 34, from which it is drawn off as required.

The motor is switched off by the timing device and the apparatus then remains at rest in readiness for the next tea-brewing operation. The next chamber 13, which has come under the hopper 22, has already received a charge of dry tea leaves. The chambers 13 not in operative positions (FIGURE 1) are free to dry out. On the turning of the rotor 1 through a further 90° in the said next operation, the compartment 3 containing spent tea leaves is brought to face downwardly, so that the said tea leaves are discharged through the openings 36 into the receptacle 38 with the assistance of the flushing action of the nozzles 39. On the next operation of the apparatus, the same compartment 3 reaches an idle, leftward-facing, position.

If it may be desired, on occasion, to brew only single batches of tea, a cut-off device may be provided in, say, the flange 20 which can be set to prevent a further charge of tea leaves from falling automatically into the chamber 13 beneath the hopper 22 as described above.

For beverages other than tea, the apparatus would of course be adapted to suit the nature and proportions of the appropriate basic ingredient and liquid to be used.

I claim:

1. Apparatus for the brewing of tea comprising a rotor mounted for rotation about a substantially horizontal axis, means dividing said rotor into a plurality of equal compartments fixedly attached to said rotor and having imperforate walls open at the peripheral surface of said rotor and each capable of holding a charge of tea leaves and boiling water, driving means for rotating the said rotor intermittently about the said axis, charging means for supplying each of said compartments in succession with predetermined charges of tea leaves and boiling water in an upper position, in which position the respective compartment is then maintained with the said charges held in it for a predetermined infusion period, and a receptacle arranged to receive the infused tea decanted from the respective compartments when they are tilted from the said upper position to a lateral position by the rotation of the said rotor.

2. Apparatus as claimed in claim 1, wherein the said charging means comprises dispensing means for dry tea leaves having a plurality of tea leaf-measuring chambers which can be brought in succession to a position in which a chamber receives a charge of tea leaves and a position in which the said chamber delivers the said charge into the upper compartment of the rotor and also establishes communication for the passage of boiling water into the said compartment.

3. Apparatus as claimed in claim 1, wherein the rotor has four compartments and means is provided for turning said rotor through 90° at a time, so that by reason of the said turning, each compartment progresses in successive operations from the upper charging and infusion position, through the lateral tea-decanting position, a lower tea leaf-discharging position and a lateral idle position back to the upper position.

4. Apparatus as claimed in claim 1, wherein the compartments are of elongated form and paraboliform cross section.

5. Apparatus as claimed in claim 1, wherein charge dispensing means operable in timed relation with the operation of the rotor is provided for controlling the supply of charges of dry tea leaves and boiling water to the upper compartment of the rotor.

6. A method of brewing tea which comprises introducing charges of tea leaves and boiling water into an open compartment of a vessel, which is formed with a plurality of such compartments and is automatically rotatable intermittently about a substantially horizontal axis, in one position of the said vessel, retaining the said charges in the said compartment for a predetermined infusion period in the said position and decanting the tea from the said compartment, by the rotation of the said vessel, in another position of the said compartment.

References Cited in the file of this patent

UNITED STATES PATENTS

| 1,813,872 | Bausman | July 7, 1931 |
| 2,014,325 | Grilli | Sept. 10, 1935 |

FOREIGN PATENTS

| 98,027 | Sweden | Feb. 13, 1940 |
| 780,996 | Great Britain | Aug. 13, 1957 |